(No Model.)
C. W. RENEAU.
CONVEYER.
No. 489,831. Patented Jan. 10, 1893.
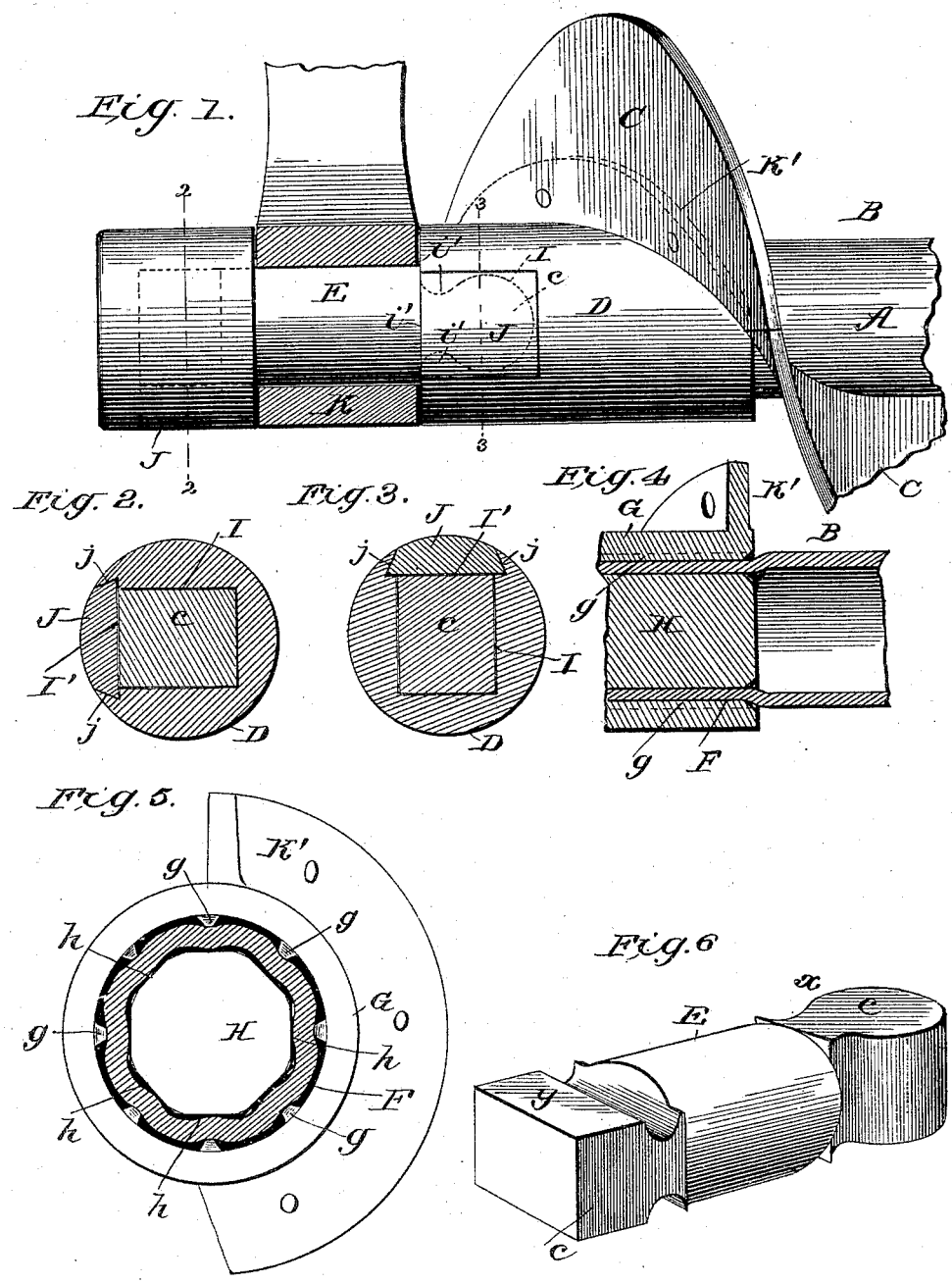
WITNESSES:
Fred G. Dieterich
P. B. Turpin
INVENTOR:
C. W. Reneau
BY Munn & Co.
ATTORNEYS

United States Patent Office.

CHARLES W. RENEAU, OF MERIDIAN, MISSISSIPPI, ASSIGNOR OF ONE-HALF TO JOHN A. LEWIS, OF SAME PLACE.

CONVEYER.

SPECIFICATION forming part of Letters Patent No. 489,831, dated January 10, 1893.

Application filed May 28, 1892. Serial No. 434,810. (No model.)

*To all whom it may concern:*

Be it known that I, CHARLES W. RENEAU, of Meridian, in the county of Lauderdale and State of Mississippi, have invented a new and useful Improvement in Conveyers, of which the following is a specification.

My invention is an improvement in conveyers and especially in the couplings for the conveyer sections and the invention consists in the novel constructions and combinations of parts as will be hereinafter described and pointed out in the claims.

In the drawings—Figure 1 is an elevation of a part of a conveyer provided with my improvement. Figs. 2 and 3 are cross sections on respectively lines 2—2 and 3—3 of Fig. 1. Fig. 4 is a partial longitudinal section. Fig. 5 is a cross section and Fig. 6 is a detail view of the journal section.

The tubes A, of the sections, B, and their flights C may be of ordinary construction.

The improvement includes coupling sections D and journal sections E such parts being constructed and being detachably connected in the manner presently described. In what for convenience of reference I may term its outer end, the coupling section D has a seat F for the end of the tube such seat being non circular and in the nature of a wavy or corrugated space or groove into which the conveyer tube may be forced by pressure. This is effected by forming the said end of the coupling D with an outer shell G and a central core H separated to provide the continuous space forming the seat F. On its inner side the shell G has longitudinal ribs $g$ while the core H is cut away or flattened at $h$ opposite the ribs $g$ the ends of said ribs and core being slightly beveled to guide the conveyer tube to place. The parts are forced together by pressure, the end of the conveyer being pressed into the seat F the said tube being creased longitudinally in such operation and so keyed to the coupling section. If, at any time, it should be necessary or desirable, a bolt can be passed transversely through the overlapped portions of the coupling and conveyer sections. It will be understood that the groove or space F is made sufficiently deep to secure a firm, strong connection between the coupling and the conveyer tube.

At its inner end or end opposite the seat F the coupling section is provided with a transverse socket I which opens at $i$ out of the end of the coupling section and at I' out of the side of said section, the opening $i$ being constructed and shoulders $i'$ being formed as shown.

The journal section E is provided at its end with a head $c$ fitted to the socket I so that it may be inserted in said socket in a lateral direction and removed in a like direction, but is held from movement into or out of said socket in the direction of length of the journal and coupling sections. Manifestly the shape of the head and socket may be varied, such parts being made approximately circular as shown at $x$ or angular as shown at $y$ without departing from some of the broad principles of the invention. When the heads are provided at both ends of the journal sections it is preferred to arrange them in direction out of line with each other—it may preferably be at right angles as shown.

Devices are provided to lock the heads from lateral movement out of their sockets. These may preferably be caps J sliding in undercut seats $j$ over the sockets I and held to their seats by the bearings K in which the journals are supported. On the coupling section I provide a spiral rib K' extending but a short distance from the face of the section and adapted to support the flight which is riveted or otherwise suitably secured thereto. Manifestly the arrangement of heads and sockets might be reversed, the heads being formed on the coupling sections and the sockets in the journal section without departing from the invention, but the construction as shown is preferred. Manifestly the coupling may be applied to connect light shafting without departing from some of the principles of the invention.

Having thus described my invention, what I claim as new and desire to secure by Letters Patent is:

1. In a conveyer a coupling section provided at one end with a central core and an outer rim and provided between said core and rim with an annular waved or corrugated space forming a seat for the end of the conveyer tube substantially as set forth.

2. In a conveyer the combination of the coupling section having at one end a central core and an outer rim and provided between said core and rim with an annular waved or corrugated space or groove and the conveyer tube pressed at one end longitudinally into said space or groove substantially as set forth.

3. In a conveyer a coupling section formed at one end with a shell G and a central core H separated to form a continuous annular groove or space F the shell G being provided on its inner wall with longitudinal ribs $g$ all substantially as and for the purposes set forth.

4. In a conveyer the combination of the coupling and journal sections provided at their adjacent ends one with a lateral transverse socket in its side and the other with a head formed to fit therein such head being movable laterally into and out of the socket and means by which to retain the head in the socket substantially as set forth.

5. In a conveyer the combination of the coupling section having a transverse socket and provided with an undercut seat $j$, the journal section having a head fitted in said socket and the cap fitted in the undercut seat $j$ substantially as set forth.

6. In a conveyer a journal section provided at its opposite ends with transverse heads arranged out of line with each other or on different radii in combination with the adjoining sections having lateral sockets arranged to receive said heads all substantially as set forth.

7. In a conveyer the combination of the coupling section provided in one end with a transverse socket opening out of the side and end of the section the end opening being contracted and an undercut seat being provided at the lateral opening of the socket the journal section having its head fitted to said socket and the cap sliding into the undercut seat all substantially as and for the purposes set forth.

8. In a conveyer a coupling section provided in its outer end with an annular non-circular groove or space and in its inner end with a socket opening out of said end and also laterally and provided at the lateral opening of said socket with an undercut seat all substantially as set forth.

9. The improvement in conveyers substantially as herein described consisting of the journal section provided at its end with the transversely extended head or tenon, the coupling section having at one end a laterally opening socket formed to receive the head or tenon and provided at its opposite end with a central core, a rim and an annular non-circular groove or space between said core and rim and the conveyer tube pressed at one end into such space all substantially as set forth.

10. In a conveyer the combination of the section provided in one end with an annular non-circular groove or space and having the outer open end of such space flared to guide the conveyer tube thereinto and the conveyer tube pressed at its end into such space all substantially as and for the purposes set forth.

CHARLES W. RENEAU.

Witnesses:
J. B. MOORE,
C. A. BROWN.